United States Patent
Tokunaga et al.

(10) Patent No.: US 8,808,073 B2
(45) Date of Patent: Aug. 19, 2014

(54) AIR PASSAGE OPEN/CLOSE DEVICE

(75) Inventors: Takahiro Tokunaga, Kosai (JP); Yukio Uemura, Nagoya (JP); Yoshikazu Sakaki, Obu (JP)

(73) Assignee: Denso Corporation, Kariya (JP)

( * ) Notice: Subject to any disclaimer, the term of this patent is extended or adjusted under 35 U.S.C. 154(b) by 1224 days.

(21) Appl. No.: 12/456,352

(22) Filed: Jun. 16, 2009

(65) Prior Publication Data
US 2009/0313899 A1    Dec. 24, 2009

(30) Foreign Application Priority Data

Jun. 19, 2008  (JP) ................................. 2008-159942

(51) Int. Cl.
*B60H 1/00*  (2006.01)
(52) U.S. Cl.
CPC ...... *B60H 1/00692* (2013.01); *B60H 2001/006* (2013.01); *B60H 2001/007* (2013.01)
USPC ........... 454/145; 454/143; 454/339; 454/254; 49/40; 49/372; 49/370
(58) Field of Classification Search
CPC .............. B60H 1/24; B60H 2001/006; B60H 2001/00635; B60H 2001/00728; B60H 2001/00692; F24F 13/24; F24F 13/00; F24F 2013/24
USPC ........................ 454/69–165, 254, 339, 62, 63
See application file for complete search history.

(56) References Cited

U.S. PATENT DOCUMENTS

| | | | | |
|---|---|---|---|---|
| 3,214,213 A | * | 10/1965 | Hezler, Jr. et al. | 160/37 |
| 4,966,219 A | * | 10/1990 | Sonolet | 160/201 |
| 5,443,300 A | * | 8/1995 | Mohammed | 296/97.4 |
| 5,535,884 A | * | 7/1996 | Scott et al. | 206/445 |
| 6,569,009 B2 | * | 5/2003 | Nishikawa et al. | 454/121 |
| 6,612,922 B2 | * | 9/2003 | Uemura et al. | 454/121 |
| 6,688,964 B2 | * | 2/2004 | Uemura et al. | 454/121 |
| 6,814,138 B2 | * | 11/2004 | Tsurushima et al. | 165/202 |

(Continued)

FOREIGN PATENT DOCUMENTS

| | | | |
|---|---|---|---|
| JP | 2004-136700 | 5/2004 | |
| JP | 2004136700 A | * 5/2004 | ............... B60H 1/00 |

(Continued)

OTHER PUBLICATIONS

Office action dated Mar. 9, 2010 in corresponding Japanese Application No. 2008-159942.

(Continued)

*Primary Examiner* — Steven B McAllister
*Assistant Examiner* — Ko-Wei Lin
(74) *Attorney, Agent, or Firm* — Harness, Dickey & Pierce, P.L.C.

(57) ABSTRACT

An air passage open/close device includes a casing having an air passage, and a sliding door having a board member slidably located in the casing so as to open or close the air passage. The casing has a guide groove for guiding a movement of the board member. The guide groove has an upstream wall extending in a moving direction of the board member at an upstream side of the board member in an air flow direction, and a downstream wall opposing to the upstream wall at a downstream side of the board member in the air flow direction. The board member is configured to be elastically deformed when the board member is arranged in the casing.

28 Claims, 5 Drawing Sheets

(56) References Cited

U.S. PATENT DOCUMENTS

| | | | |
|---|---|---|---|
| 7,395,133 B2 * | 7/2008 | Lowe | 700/218 |
| 7,431,638 B2 * | 10/2008 | Natsume et al. | 454/121 |
| 7,540,321 B2 * | 6/2009 | Simmet et al. | 165/203 |
| 2005/0215190 A1 * | 9/2005 | Okumura et al. | 454/121 |
| 2008/0231157 A1 * | 9/2008 | Lowe | 312/400 |

FOREIGN PATENT DOCUMENTS

| | | | |
|---|---|---|---|
| JP | 2007-168522 | | 7/2007 |
| JP | 2007168522 A | * | 7/2007 |
| JP | 2007-263397 | | 10/2007 |
| JP | 2007263397 A | * | 10/2007 |

OTHER PUBLICATIONS

Office Action dated Dec. 29, 2010, in corresponding Chinese Application No. 200910148879.3, with English translation thereof.

* cited by examiner

AIR PASSAGE OPEN/CLOSE DEVICE

CROSS REFERENCE TO RELATED APPLICATION

This application is based on Japanese Patent Application No. 2008-159942 filed on Jun. 19, 2008, the disclosure of which is incorporated herein by reference in its entirety.

BACKGROUND OF THE INVENTION

1. Field of the Invention

The present invention relates to an open/close device for opening or closing an air passage. The open/close device can be suitably used in an air-conditioning apparatus for an automotive vehicle.

2. Description of Related Art

JP-A-2004-136700 discloses an air passage open/close device, in which a casing defining an air passage has a guide groove. The guide groove guides an end of a sliding door in a width direction. The sliding door reciprocatedly moves along the guide groove, and the air passage of the casing is opened or closed by the movement of the sliding door.

The sliding door is pressed to a sealing face of the casing due to a wind pressure of blown air. Thus, sealing performance can be achieved when the air passage is closed.

A curvature radius of the sliding door is made equal to or larger than a curvature radius of the sealing face of the casing. Thereby, ends of the sliding door in a moving direction can easily contact the sealing face of the casing, when the sliding door is arranged in the casing. Therefore, even if an amount of wind is small, the sliding door can be pressed to the sealing face of the casing due to a wind pressure of blown air. Thus, the sealing performance can be achieved by the sliding door.

However, when the wind pressure of blown air is not applied to the sliding door, the sliding door is not pressed to the sealing face of the casing. If the casing vibrates in this state, the ends of the sliding door in the moving direction also vibrate. Therefore, the sliding door may generate noises such as fluttering sound.

A gasket for pressing the sliding door to the sealing face of the casing may be added to the air passage open/close device. Due to the gasket, the sliding door can be pressed to the sealing face of the casing, even when the wind pressure of blown air is not applied to the sliding door. However, the addition of the gasket increases a cost of the device.

SUMMARY OF THE INVENTION

In view of the foregoing and other problems, it is an object of the present invention to provide an air passage open/close device.

According to a first example of the present invention, an air passage open/close device includes a casing having an air passage and a sliding door having a board member slidably located in the casing. The board member opens or closes the air passage of the casing. The casing has a guide groove guides a movement of the board member. The guide groove has an upstream wall extending in a direction of the movement of the board member and being located at an upstream side of the board member in an air flow direction, and a downstream wall opposing to the upstream wall and being located at a downstream side of the board member in the air flow direction. The board member is configured to be elastically deformed when the board member is arranged in the casing.

Accordingly, vibrations of the sliding door can be reduced.

According to a second example of the present invention, an air passage open/close device includes a casing having an air passage, and a sliding door having a board member slidably located in the casing. The board member opens or closes the air passage of the casing. The casing has a guide groove for guiding a movement of the board member, and the guide groove having two inner walls. The board member has a curved shape in contact with the two inner walls of the guide groove at a plurality of contact points. The board member has an elastic resilient force relative to the two inner walls of the guide groove at the contact points, when the board member is arranged in the guide groove of the casing.

Accordingly, vibrations of the sliding door can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT (First Embodiment)

Figure 1:
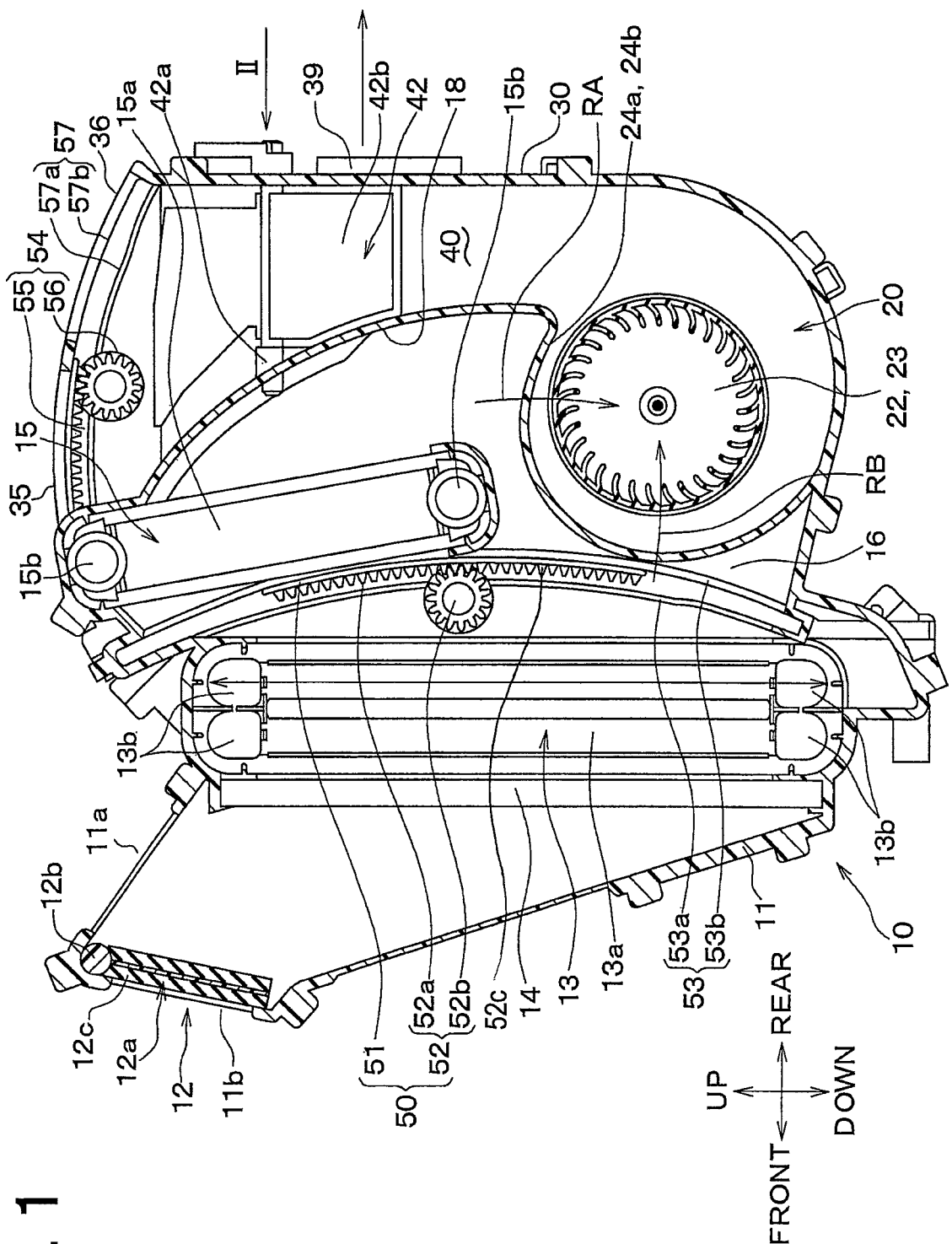
FIG. 1 is a cross-sectional view illustrating an air-conditioning unit according to a first embodiment.
Figure 2:
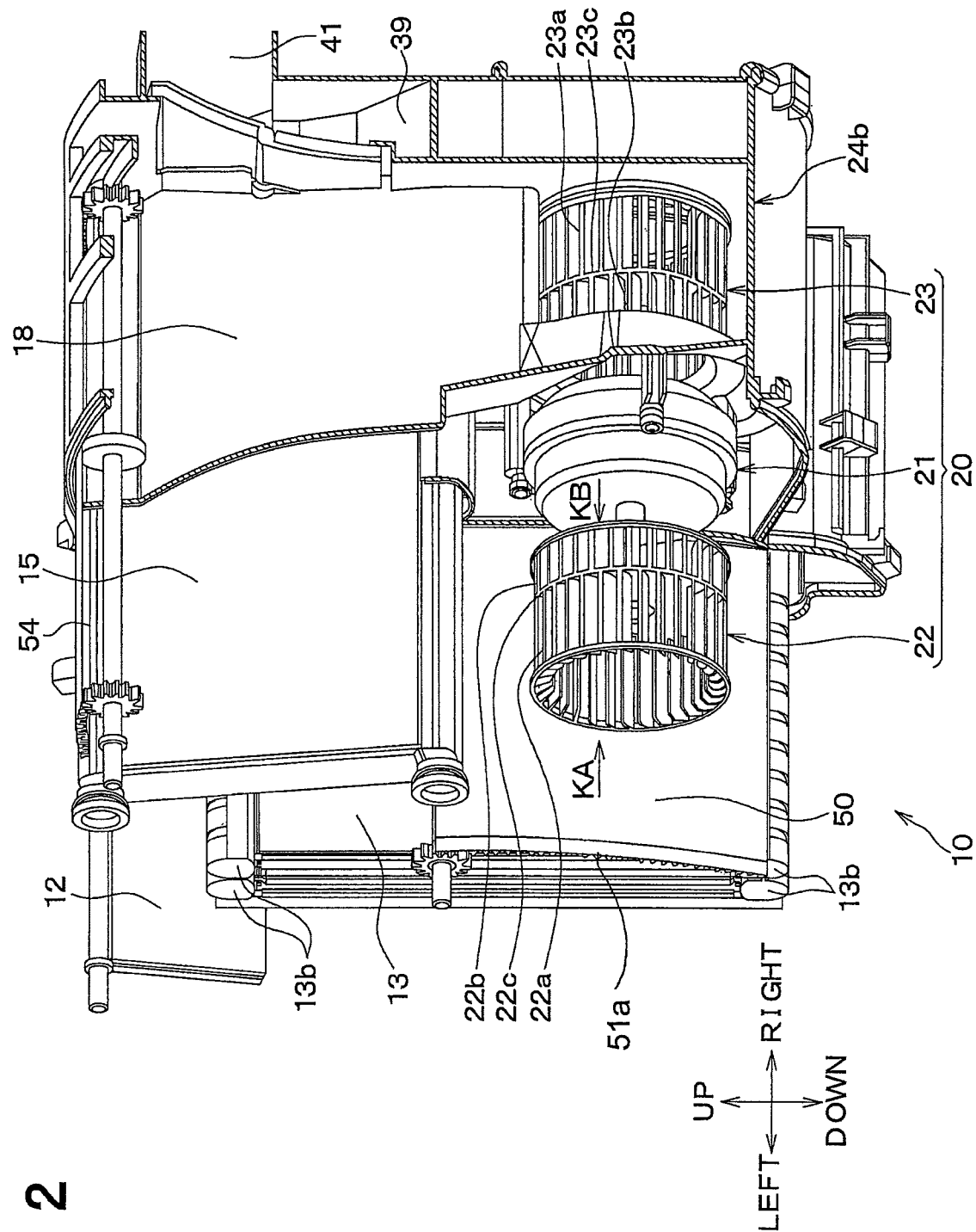
FIG. 2 is a perspective cross-sectional view illustrating the air-conditioning unit in an arrow direction II of FIG. 1.

An air passage open/close device is used in an air-conditioning apparatus for an automobile, for example. FIG. 1 is a cross-sectional view illustrating an air-conditioning unit 10 of the air-conditioning apparatus in a lateral direction of a vehicle compartment of the automobile. FIG. 2 is a lateral cross-sectional view seen from an arrow direction II of FIG. 1. Arrows indicating up, down, front, rear, left, and right in FIG. 1 and FIG. 2 are defined when the air-conditioning unit 10 is mounted in the automobile.

The air-conditioning unit 10 is disposed in an inner area of an instrument panel located in a front part of the vehicle compartment. Further, the air-conditioning unit 10 is arranged at an approximately center position in a lateral direction of the automobile, that is a width direction of the automobile. The air-conditioning unit 10 includes a casing 11 defining an air passage for air blown toward the vehicle compartment. The lateral direction of the automobile corresponds to a width direction of the casing 11. The casing 11 is molded of resin having a predetermined elasticity and strength. The casing 11 is made of polypropylene, for example.

The casing 11 is made of two parts separated at an approximately center position of the lateral direction of the automobile. The two parts are integrally connected to each other through a divided face by a connecting portion such as a metal spring, clip, or screw. Elements such as an air filter 14, an evaporator 13, a heater core 15 to be described below are disposed in the casing 11 before the integration of the two parts.

As shown in a front and upper side of FIG. 1, the casing 11 has a switching portion 12 for introducing inside air inside of the vehicle compartment or outside air outside of the vehicle compartment. The switching portion 12 is positioned at the most upstream part of the air passage defined in the casing 11. The switching portion 12 defines an inside air inlet 11a for introducing the inside air into the casing 11, and an outside air inlet 11b for introducing the outside air into the casing 11.

The switching portion 12 has a switching door 12a for rotatably opening or closing the inside air inlet 11a and the outside air inlet 11b. Specifically, the switching door 12a is constructed by integrating a door board 12c, and a rotation axis 12b. The rotation axis 12b extends in the lateral direction of the automobile, and is connected to an end of the door board 12c. The switching door 12a is a cantilever type door, for example.

When the rotation axis 12b is rotated by a servomotor (not shown), the door board 12c is rotatably displaced. Thus, an opening area of the inside air inlet 11a and the outside air inlet 11b can be continuously changed. The evaporator 13 is disposed at a downstream side of the switching portion 12 in an air flow direction.

The evaporator 13 is a part of a known vapor compression type refrigeration cycle (not shown). The evaporator 13 is a heat exchanger for cooling air blown into the vehicle compartment, because endothermic action is promoted by evaporating low-pressure refrigerant of the refrigeration cycle.

The evaporator 13 has a flat shape, and is constructed with a core 13a and tanks 13b. The core 13a is constructed with tubes and a heat-exchanging fin, and tanks 13b are located at ends of the core 13a. A flat face of the evaporator 13 is approximately parallel to an up-and-down direction of the automobile.

The tubes are located parallel to the up-and-down direction, and refrigerant flows in the tubes. The heat-exchanging fin promotes heat exchange between refrigerant flowing in the tube and air. The tank 13b located at upper end or lower end of the tubes distributes refrigerant into the tubes, or collects refrigerant from the tubes. The tanks 13b are supported by the casing 11.

The air filter 14 has a plate shape, for example, and is located inside of the casing 11 at an upstream side of the evaporator 13 in an air flow direction. The air filter 14 removes dusts from air to be introduced into the evaporator 13.

The heater core 15 is located at a downstream side of the evaporator 13 in an air flow direction, and is located at rear and upper side of the automobile. The heater core 15 is a heat exchanger for reheating air cooled by the evaporator 13. High-temperature engine-cooling water circulating in an engine coolant circuit (not shown) flows into the heater core 15, and heat is exchanged between the engine-cooling water and the cooled air cooled by the evaporator 13.

The heater core 15 has a flat shape, and is constructed with a core 15a and tanks 15b, similar to the evaporator 13. The core 15a is constructed with tubes and a heat-exchanging fin, and tanks 15b are located at ends of the core 15a. The heater core 15 is located approximately parallel to the evaporator 13, or is located to have a predetermined angle between a flat face of the heater core 15 and a flat face of the evaporator 13. The predetermined angle is smaller than about 30°, for example, such that an upper end of the heater core 15 is slightly closer to the front side of the automobile than a lower end of the heater core 15.

The tubes of the core 15a are located approximately parallel to the up-and-down direction of the heater core 15 with the predetermined angle. The tank 15b located at upper side distributes refrigerant into the tubes, and the tank 15b located at lower side collects refrigerant from the tubes. The tanks 15b are supported by the casing 11, respectively.

A bypass passage 16 is defined at a rear side of the evaporator 13, and is defined at a lower side of the heater core 15. Air cooled by the evaporator 13 bypasses the heater core 15, due to the bypass passage 16.

An air-mixing door 50 is located directly at a rear side of the evaporator 13. The air-mixing door 50 changes a separating ratio between cooled air to be introduced into the heater core 15 and cooled air to be introduced into the bypass passage 16. The air-mixing door 50 corresponds to a sliding door including a board member 51 and a gear 52. The board member 51 has an arc shape extending in the up-and-down direction of the automobile, and the gear 52 drives the board member 51 to be displaced in a curved direction of the board member 51.

When the board member 51 of the air-mixing door 50 is slided toward the upper direction of the automobile, an opening degree of the bypass passage 16 is increased, and an opening degree of the heater core 15 is decreased. In contrast, when the board member 51 is slided toward the lower direction of the automobile, the opening degree of the bypass passage 16 is decreased, and the opening degree of the heater core 15 is increased.

Due to the change of the opening degree by the air-mixing door 50, a mixing ratio between cooled air and warmed air is changed. The mixed air is to be sent toward a blower 20 for sending air toward the vehicle compartment. Thus, temperature of air blown toward the vehicle compartment can be controlled. That is, the air-mixing door 50 corresponds to a temperature controlling portion for controlling a temperature of air blown into the vehicle compartment.

The gear 52 includes a rack 52a and a pinion 52b. The rack 52a has a plurality of gear teeth 52c and is disposed on the board member 51, and extends in a sliding direction of the board member 51. The pinion 52b is engaged with the rack 52a, and is driven by a servomotor (not shown). The rack 52a and the pinion 52b are located at an upstream side of the board member 51 in an air flow direction, for example.

The rack 52a and the pinion 52b are located adjacent to an end of the board member 51 in the width direction. Specifically, the rack 52a and the pinion 52b are located in a slightly inner area from the end of the board member 51 in the width direction of the automobile.

The casing 11 has a guide groove 53 for guiding a movement of the board member 51. The guide groove 53 is arranged for both ends of the board member 51 in the width direction of the automobile. Further, the guide groove 53 has an upstream wall 53a and a downstream wall 53b. The upstream wall 53a of the guide groove 53 extends in a moving direction of the board member 51, and is located at an upstream side of the board member 51 in an air flow direction. The downstream wall 53b of the guide groove 53 opposes to the upstream wall 53a, and is located at a downstream side of the board member 51 in an air flow direction.

The end of the board member 51 in the width direction of the automobile is slidably arranged between the upstream wall 53a and the downstream wall 53b. That is, a peripheral part 51a of the board member 51 outside from the rack 52a in the width direction of the automobile is slidably arranged between the upstream wall 53a and the downstream wall 53b. Thereby, the movement of the board member 51 is guided by the guide groove 53 constructed with the upstream wall 53a and the downstream wall 53b.

The blower 20 is disposed in the casing 11, and located at a lower side of the heater core 15. As shown in FIG. 1 and FIG.

2, the blower 20 includes an electric motor 21, impeller wheels 22, 23, and scroll casings 24a, 24b. The electric motor 21 is located at an approximately center position of the casing 11 in the lateral direction of the automobile. A rotation axis of the electric motor 21 extends in the lateral direction of the automobile.

The impeller wheel 22, 23 is a centrifugal multi-blade fan, for example. The impeller wheel 22 is fixed to a left end of the rotation axis of the electric motor 21, and includes fan portions 22a, 22b and a partition 22c separating the fan portions 22a, 22b. The fan portion 22a has blades arranged around the rotation axis, and intakes air from a left side of the rotation axis in a direction KA of FIG. 2. The fan portion 22a blows air outward in a radical direction. The fan portion 22b has blades arranged around the rotation axis, and intakes air from a right side of the rotation axis in a direction KB of FIG. 2. The fan portion 22b blows air outward in a radical direction. Thereby, the impeller wheel 22 intakes air from both sides of the rotation axis, and blows air outward in a radical direction.

The impeller wheel 23 is fixed to a right end of the rotation axis of the electric motor 21, and includes fan portions 23a, 23b and a partition 23c separating the fan portions 23a, 23b. The fan portion 23a has blades arranged around the rotation axis, and intakes air from a left side of the rotation axis. The fan portion 23a blows air outward in a radical direction. The fan portion 23b has blades arranged around the rotation axis, and intakes air from a right side of the rotation axis. The fan portion 23b blows air outward in a radical direction. Thereby, the impeller wheel 23 intakes air from both sides of the rotation axis, and blows air outward in a radical direction.

The scroll casing 24a accommodates the fan portions 22a, 22b of the impeller wheel 22, respectively, and defines a blown air passage through which air blown from the fan portions 22a, 22b passes. The scroll casing 24a has a scroll shape such that a cross-sectional area of the blown air passage is gradually enlarged toward a rotation direction of the impeller wheel 22. The scroll casing 24a has two air-intaking inlets located at both sides of the rotation axis, respectively, and an outlet for blowing out air upward from the impeller wheel 22.

The scroll casing 24b accommodates the fan portions 23a, 23b of the impeller wheel 23, respectively, and defines a blown air passage through which air blown from the fan portions 23a, 23b passes. The scroll casing 24b has a scroll shape such that a cross-sectional area of the blown air passage is gradually enlarged toward a rotation direction of the impeller wheel 23. The scroll casing 24b has two air-intaking inlets located at both sides of the rotation axis, respectively, and an outlet for blowing out air upward from the impeller wheel 23.

As shown in FIG. 1, a separation wall 18 is disposed in the casing 11. The separation wall 18 has a curved shape, and is located at a rear side of the heater core 15. The separation wall 18 corresponds to a leading wall to introduce air warmed by the heater core 15 toward the blower 20.

An air passage 40 is defined between the separation wall 18 and an external rear wall of the casing 11. The air passage 40 introduces the warmed air from the scroll casings 24a, 24b toward outlets 35, 36. The outlet 36 is defined in a top face of the casing 11, and is located at a rear side. The outlet 36 corresponds to a face opening from which air flow passing through the air passage 40 is blown toward an upper body of an occupant in the automobile.

The outlet 35 is defined in the top face of the casing 11, and is located at a front side, relative to the outlet 36. The outlet 35 corresponds to a defroster opening from which air flow passing through the air passage 40 is blown toward an inner surface of a windshield of the automobile. A blow-mode door 54 is disposed on an inner side of the outlets 35, 36 of the casing 11, and the outlets 35, 36 are located at an upper side of the blower 20.

The blow-mode door 54 corresponds to a sliding door, similar to the air-mixing door 50, including a board member 55 and a gear 56. The board member 55 has an arc shape extending in a front-and-rear direction of the automobile, and the gear 56 drives the board member 55 to be displaced in a curved direction of the board member 55.

When the board member 55 of the blow-mode door 54 is slided toward the front direction of the automobile, an opening degree of the outlet 36 is increased, and an opening degree of the outlet 35 is decreased. In contrast, when the board member 55 is slided toward the rear direction of the automobile, the opening degree of the outlet 36 is decreased, and the opening degree of the outlet 35 is increased.

The gear 56 of the blow-mode.door 54 includes a rack and a pinion, similar to the gear 52 of the air-mixing door 50. A guide groove 57 for guiding a movement of the board member 55 of the blow-mode door 54 has an upstream wall 57a and a downstream wall 57b, similar to the guide groove 53 of the air-mixing door 50. The upstream wall 57a is located at an upstream side of the board member 55 in an air flow direction, and the downstream wall 57b is located at a downstream side of the board member 55 in an air flow direction.

As shown in FIG. 1, a rear wall 30 of the casing 11 has a rear-seat foot opening 39, and air flowing through the air passage 40 is blown toward a foot of an occupant seated on a rear-seat of the automobile through the rear-seat foot opening 39. As shown in FIG. 2, the casing 11 has a front-seat foot opening 41, and air flowing through the air passage 40 is blown toward a foot of an occupant seated on a front-seat of the automobile through the front-seat foot opening 41. The foot opening 39, 41 is located at upper side relative to the blower 20.

A foot door 42 is disposed in the casing 11, and is located at an inner side of the foot opening 39, 41. The foot door 42 is a butterfly door, for example, having a rotation axis 42a and a main plate 42b. The rotation axis 42a extends in the front-and-rear direction of the automobile, and is integrated with an approximately center part of the main plate 42b. The rotation axis 42a is rotated by a servomotor (not shown) so as to rotatably move the main plate 42b. Thus, the foot opening 39, 41 is opened or closed.

Operation of the air-conditioning unit 10 will be described. When the electric motor 21 of the blower 20 rotates the impeller wheel 22, the impeller wheel 22 intakes air through the two inlets of the scroll casing 24a so as to blow air out from the outlet of the scroll casing 24a.

When the electric motor 21 of the blower 20 rotates the impeller wheel 23, the impeller wheel 23 intakes air through the two inlets of the scroll casing 24b to blow air out from the outlet of the scroll casing 24b. Therefore, air is introduced into the casing 11 through at least one of the inside air inlet 11a and the outside air inlet 11b.

The introduced air passes into the evaporator 13 through the air filter 14. When air passes through the evaporator 13, the air is cooled, because heat is exchanged between the air and refrigerant.

When the air-mixing door 50 opens each of the bypass passage 16 and the heater core 15, a part of cooled air blown from the evaporator 13 flows into the heater core 15, and is heated by the heater core 15. Thus, heated air is blown from the heater core 15.

The heated air is introduced toward the blower 20 by the separation wall 18 in a direction RA of FIG. 1. The other cooled air blown from the evaporator 13 passes through the bypass passage 16 in a direction RB of FIG. 1.

Thus, the cooled air passing through the bypass passage 16 and the heated air blown from the heater core 15 flow into the inlets of the scroll casing 24a. The cooled air and the heated air collide with each other with an angle of about 90°, before the cooled air and the heated flow into the inlets of the scroll casing 24a. Further, the cooled air passing through the bypass passage 16 and the heated air blown from the heater core 15 flow into the inlets of the scroll casing 24b. The cooled air and the heated air collide with each other with an angle of about 90°, before the cooled air and the heated flow into the inlets of the scroll casing 24b.

Due to operation of the impeller wheel 22, 23, the collided air constructed with the cooled air and the heated air is drawn into the impeller wheel 22, 23 and blown out in a radial direction. Thereby, air-conditioning air can be formed by mixing the cooled air and the heated air, and is blown out in the radial direction.

The air-conditioning air is blown into the air passage 40 through the scroll casing 24a, 24b. The blown air-conditioning air passes through the air passage 40, and is blown into the vehicle compartment through one of the outlets 36, 37 and the foot openings 39, 41.

Figure 3:
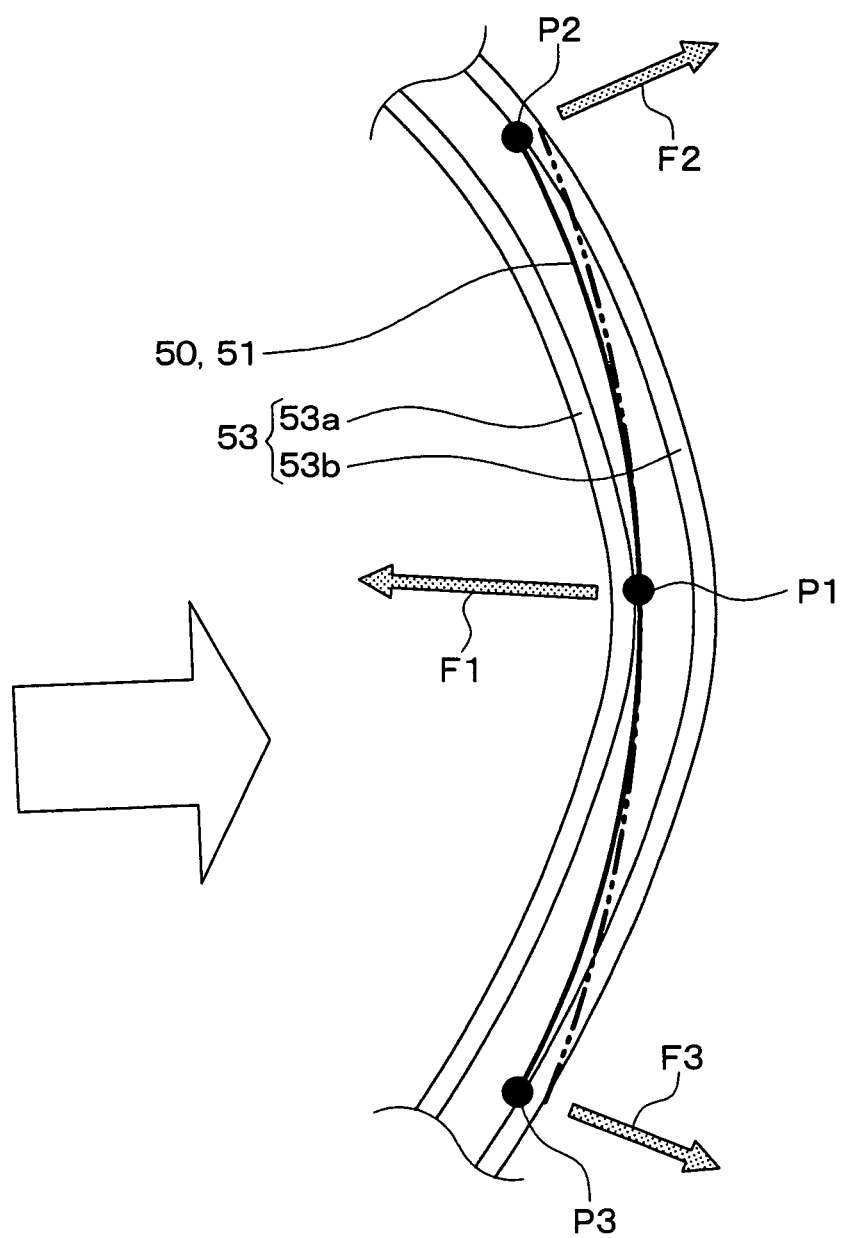
FIG. 3 is a schematic enlarged view illustrating an air-mixing door and a guide groove of the air-conditioning unit of FIG. 1.

FIG. 3 is a schematic enlarged view illustrating the air-mixing door 50 and the guide groove 53 of FIG. 1. The board member 51 of the air-mixing door 50 is shown in a bold line, and the gear 52 of the air-mixing door 50 is omitted in FIG. 3.

A double-chain line of FIG. 3 shows the board member 51 before the air-mixing door 50 is assembled to the guide groove 53. That is, the double-chain line of FIG. 3 shows the board member 51 in unrestraint state. A solid line of FIG. 3 shows the board member 51 after the air-mixing door 50 is assembled to the guide groove 53. That is, the solid line of FIG. 3 shows the board member 51 restrained by the guide groove 53.

As shown in FIG. 3, a curvature radius of the board member 51 is set larger than a curvature radius of the wall 53a, 53b of the guide groove 53, before the air-mixing door 50 is assembled to the guide groove 53.

After the air-mixing door 50 is assembled to the guide groove 53, a middle part of the board member 51 in a moving direction contacts the upstream wall 53a at a contact point P1. Further, both ends of the board member 51 in the moving direction contact the downstream wall 53b at contact points P2, P3, respectively. Thus, the board member 51 is elastically bent, and deformed.

An elastic resilient force F1, F2, F3 is generated at the contact point P1, P2, P3, because the board member 51 is going to go back to a state before the board member 51 is restrained by the guide groove 53. Due to the elastic resilient force F1, F2, F3, the board member 51 is pushed onto the upstream wall 53a and the downstream wall 53b. That is, the board member 51 is pushed onto the upstream wall 53a and the downstream wall 53b, due to an elastic deformation force of the board member 51.

The board member 51 may be pushed onto the upstream wall 53a and the downstream wall 53b in all operation range of the board member 51. Positions at which the board member 51 is pushed onto the upstream wall 53a and the downstream wall 53b are not limited.

According to the first embodiment, the board member 51 is supported at three points, for example, at the both ends and the middle part in the moving direction. Therefore, if a whole of the air-conditioning unit 10 is vibrated while a wind pressure is not applied to the board member 51, noises such as fluttering sound can be reduced, because the ends of the board member 51 are restricted.

Further, because the guide groove 53 is arranged both sides of the board member 51 in the width direction, the both sides of the board member 51 are supported through the three contact points P1, P2, P3. Therefore, vibration of the ends of the board member 51 in the moving direction can be further reduced. Accordingly, noises can be further reduced.

Figure 4:
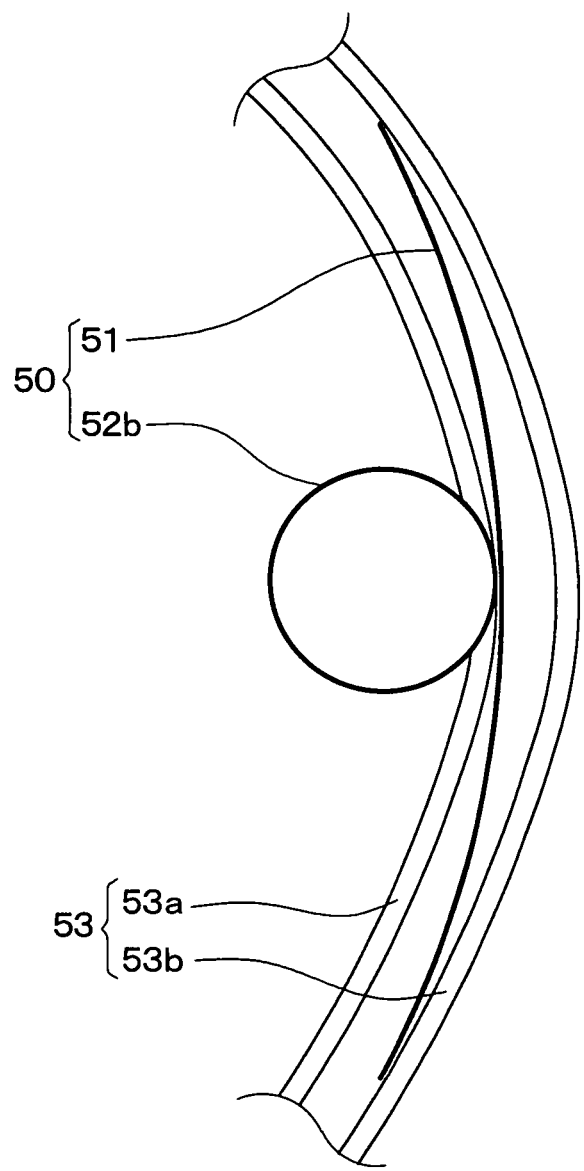
FIG. 4 is a schematic enlarged view illustrating an air-mixing door and a guide groove of an example of the air-conditioning unit.

FIG. 4 is a schematic enlarged view illustrating the air-mixing door 50 and the guide groove 53, as an arrangement example. The board member 51 and a pitch circle of the pinion 52b of the air-mixing door 50 are shown in bold lines, and the rack 52a is omitted in FIG. 4.

The pitch circle of the pinion 52b is located approximately the same position as the upstream wall 53a, when the pinion 52b is seen parallel to the width direction of the board member 51, as shown in FIG. 4. For example, a part of the pitch circle of the pinion 52b is located on approximately the same line as a downstream surface of the upstream wall 53a in the width direction of the board member 51. The width direction of the board member 51 corresponds to a rotation axis direction of the pinion 52b. Therefore, the board member 51 may contact the pinion 52b in place of the upstream wall 53a, based on an operating position of the board member 51. In this case, the board member 51 is also supported by the guide groove 53 through three points, in all operation range of the board member 51.

The board member 55 of the blow-mode door 54 is supported at three points, for example, of both ends and a middle part in a moving direction of the board member 55, similar to the board member 51 of the air-mixing door 50. Therefore, noises such as fluttering sound can be reduced, because vibration of the ends of the board member 55 in the moving direction can be reduced.

The guide groove 53 may be located at a single side of the board member 51 in the width direction. The air-conditioning unit 10 may be used in an installed type air-conditioning apparatus, for example, other than the air-conditioning apparatus for the automobile.

(Second Embodiment)

In the first embodiment, the curvature radius of the board member 51 is set larger than the curvature radius of the wall 53a, 53b of the guide groove 53. In contrast, in a second embodiment, a curvature radius of a board member 51 is set smaller than a curvature radius of an upstream wall 53a, and a downstream wall 53b of a guide groove 53.

Figure 5:
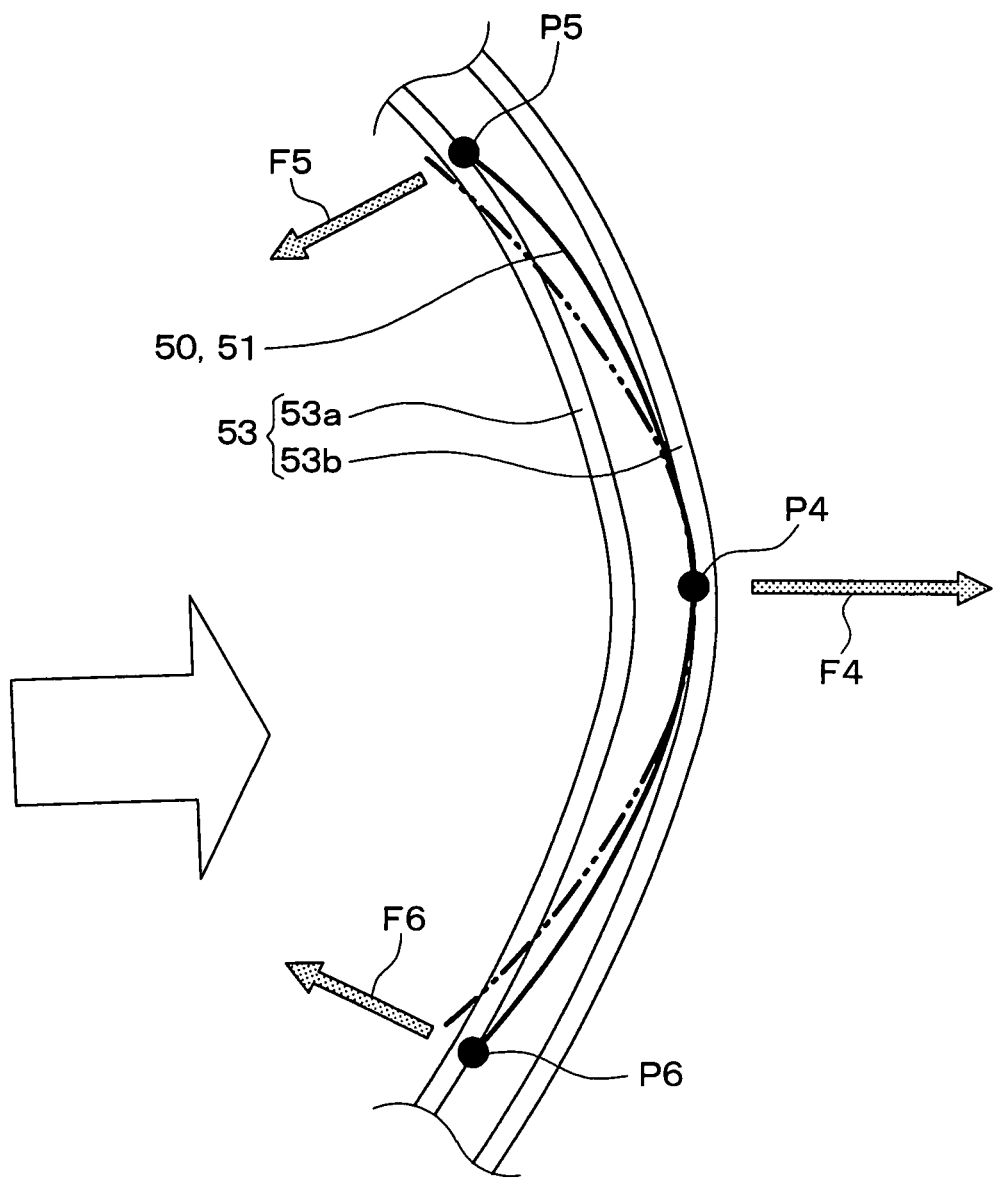
FIG. 5 is a schematic enlarged view illustrating an air-mixing door and a guide groove of an air-conditioning unit according to a second embodiment.

FIG. 5 is a schematic enlarged view illustrating the air-mixing door 50 and the guide groove 53. The board member 51 of the air-mixing door 50 is shown in a bold line, and a gear 52 of the air-mixing door 50 is omitted in FIG. 5. A double-chain line of FIG. 5 shows the board member 51 before the air-mixing door 50 is assembled to the guide groove 53. That is, the double-chain line of FIG. 5 shows the board member 51 in an unrestraint state. A solid line of FIG. 5 shows the board member 51 after the air-mixing door 50 is assembled to the guide groove 53. That is, the solid line of FIG. 5 shows the board member 51 restrained by the guide groove 53.

After the air-mixing door 50 is assembled in a casing 11, a middle part of the board member 51 in a moving direction contacts the downstream wall 53b at a contact point P4. Further, both ends of the board member 51 in the moving direction contact the upstream wall 53a at contact points P5, P6, respectively. Thus, the board member 51 is elastically bent and deformed.

An elastic resilient force F4, F5, F6 is generated at the contact point P4, P5, P6, because the board member 51 is going to go back to a state before the board member 51 is restrained by the guide groove 53. Due to the elastic resilient force F4, F5, F6, the board member 51 is pushed onto the upstream wall 53*a* and the downstream wall 53*b*.

According to the second embodiment, the board member 51 is supported at three points, for example, at the both ends and the middle part in the moving direction. Therefore, noises such as fluttering sound can be reduced, because vibrations of the ends of the board member 51 are restricted.

The guide groove 53 may be located at a single side of the board member 51 in the width direction.

The air-conditioning unit 10 may be used in an installed type air-conditioning apparatus, for example, other than the air-conditioning apparatus for the automobile.

Such changes and modifications are to be understood as being within the scope of the present invention as defined by the appended claims.

What is claimed is:

1. An air passage open/close device comprising:
a casing having an air passage; and
a sliding door having a board member slidably located in the casing, the board member opening or closing the air passage of the casing, wherein
the casing has a guide groove for guiding a movement of the board member, the guide groove having
an upstream wall extending in a direction of the movement of the board member and being located at an upstream side of the board member in an air flow direction, and
a downstream wall opposing to the upstream wall and being located at a downstream side of the board member in the air flow direction, wherein
the board member is configured to be elastically deformed when the board member is arranged in the casing,
the board member in an unrestrained state has a curvature radius set larger than a curvature radius of the upstream wall and a curvature radius of the downstream wall,
the board member has opposing ends in the direction of the movement of the board member, the opposing ends being in contact with the downstream wall when the board member is arranged in the casing,
the board member has a middle part between the opposing ends in the direction of the movement of the board member, the middle part being in contact with the upstream wall when the board member is arranged in the casing;
the entire board member has no opening part passing through the board member in a thickness direction of the board member,
the sliding door has a gear attached to and driving the board member,
the gear has a rack having a plurality of gear teeth arranged on the board member, and the rack extends in the direction of the movement of the board member, and
the board member has a peripheral part located on an outer side from the rack in a width direction of the board member, and the peripheral part is inserted between the upstream wall and the downstream wall.

2. The air passage open/close device according to claim 1, wherein
the gear has a pinion engaged with at least one of the plurality of teeth of the rack, and
the pinion has a pitch circle located at an approximately same position as the upstream wall, when the pinion is seen parallel to a width direction of the board member.

3. The air passage open/close device according to claim 1, wherein
the board member is elastically deformed in contact with the upstream wall and the downstream wall in all operation range of the board member.

4. The air passage open/close device according to claim 1, wherein
the guide groove is arranged at both sides of the board member in a width direction of the board member.

5. An air passage open/close device comprising:
a casing having an air passage; and
a sliding door having a board member slidably located in the casing, the board member opening or closing the air passage of the casing, wherein
the casing has a guide groove for guiding a movement of the board member, the guide groove having two inner walls, wherein
the board member has a curved shape in contact with the two inner walls of the guide groove;
the board member has an elastic resilient force relative to the two inner walls of the guide groove when the board member is arranged in the guide groove of the casing;
the board member in an unrestrained state has a curvature radius set larger than a curvature radius of the two inner walls;
the board member has opposing ends in the direction of movement of the board member, the opposing ends being in contact with one of the two inner walls when the board member is arranged in the casing; and
the board member has a middle part between the opposing ends in the direction of the movement of the board member, the middle part being in contact with the other of the two inner walls when the board member is arranged in the casing;
the entire board member has no opening passing through the board member in a thickness direction of the board member,
the sliding door has a gear attached to and driving the board member,
the gear has a rack having a plurality of gear teeth arranged on the board member, and the rack extends in the direction of the movement of the board member, and
the board member has a peripheral part located on an outer side from the rack in a width direction of the board member, and the peripheral part is inserted between the upstream wall and the downstream wall.

6. The air passage open/close device according to claim 5, wherein
the two inner walls are constructed with
an upstream wall extending in a direction of the movement of the board member and being located at an upstream side of the board member in an air flow direction, and
a downstream wall opposing to the upstream wall and being located at a downstream side of the board member in the air flow direction, and
the elastic resilient force generated relative to the upstream wall has a direction opposite to a direction of the elastic resilient force generated relative to the downstream wall.

7. An air passage open/close device comprising:
a casing having an air passage; and
a sliding door having a board member slidably located in the casing, the board member opening or closing the air passage of the casing, wherein the casing has a guide groove for guiding a movement of the board member, the guide groove having
   an upstream wall extending in a direction of the movement of the board member and being located at an upstream side of the board member in an air flow direction, and
   a downstream wall opposing to the upstream wall and being located at a downstream side of the board member in the air flow direction, wherein
the board member is configured to be elastically deformed when the board member is arranged in the casing,
the board member in an unrestrained state has a curvature radius set smaller than a curvature radius of the upstream wall and a curvature radius of the downstream wall,
the board member has opposing ends in the direction of the movement of the board member, the opposing ends being in contact with the upstream wall when the board member is arranged in the casing,
the board member has a middle part between the opposing ends in the direction of the movement of the board member, the middle part being in contact with the downstream wall when the board member is arranged in the casing;
the entire board member has no opening part passing through the board member in a thickness direction of the board member,
the sliding door has a gear attached to and driving the board member,
the gear has a rack having a plurality of gear teeth arranged on the board member, and the rack extends in the direction of the movement of the board member, and
the board member has a peripheral part located on an outer side from the rack in a width direction of the board member, and the peripheral part is inserted between the upstream wall and the downstream wall.

8. The air passage open/close device according to claim 7, wherein
   the gear has a pinion engaged with at least one of the plurality of teeth of the rack, and
   the pinion has a pitch circle located at an approximately the same position as the upstream wall, when the pinion is seen parallel to a width direction of the board member.

9. The air passage open/close device according to claim 7, wherein
   the board member is elastically deformed in contact with the upstream wall and the downstream wall in all operation range of the board member.

10. The air passage open/close device according to claim 7, wherein
   the guide groove is arranged at both sides of the board member in a width direction of the board member.

11. The air passage open/close device according to claim 1, wherein only the ends of the board member are in contact with the downstream wall when the board member is arranged in the casing and only the middle part of the board member is in contact with the upstream wall when the board member is arranged in the casing.

12. The air passage open/close device according to claim 1, wherein an open gap is located between the middle part of the board member and the downstream wall.

13. The air passage open/close device according to claim 12, wherein an open gap is located between the ends of the board member and the upstream wall.

14. The air passage open/close device according to claim 5, wherein only the ends of the board member are in contact with the one of the two walls when the board member is arranged in the casing and only the middle part of the board member is in contact with the other of the two walls when the board member is arranged in the casing.

15. The air passage open/close device according to claim 5, wherein an open gap is located between the middle part of the board member and the one of the two walls.

16. The air passage open/close device according to claim 15, wherein an open gap is located between the ends of the board member and the other of the two walls.

17. The air passage open/close device according to claim 7, wherein only the ends of the board member are in contact with the upstream wall when the board member is arranged in the casing and only the middle part of the board member is in contact with the downstream wall when the board member is arranged in the casing.

18. The air passage open/close device according to claim 7, wherein an open gap is located between the middle part of the board member and the upstream wall.

19. The air passage open/close device according to claim 18, wherein an open gap is located between the ends of the board member and the downstream wall.

20. The air passage open/close device according to claim 1, wherein the upstream wall and the downstream wall have a constant curvature radius in all the operation ranges of the board member.

21. The air passage open/close device according to claim 1, wherein the board member has a non-contact part between the middle part and the respective opposing ends, and the non-contact part is unable to contact the upstream wall nor the downstream wall between the middle part and the respective opposing ends.

22. The air passage open/close device according to claim 7, wherein the upstream wall and the downstream wall have a constant curvature radius in all the operation ranges of the board member.

23. The air passage open/close device according to claim 7, wherein the board member has a non-contact part between the middle part and the respective opposing ends, and the non-contact part is unable to contact the upstream wall nor the downstream wall between the middle part and the respective opposing ends.

24. The air passage open/close device according to claim 5, wherein the two inner walls have a constant curvature radius in all the operation ranges of the board member.

25. The air passage open/close device according to claim 5, wherein the board member has a non-contact part between the middle part and the respective opposing ends, and the non-contact part is unable to contact the two inner walls between the middle part and the respective opposing ends.

26. The air passage open/close device according to claim 1, wherein only the peripheral part of the board member is inserted between the upstream wall and the downstream wall.

27. The air passage open/close device according to claim 5, wherein only the peripheral part of the board member is inserted between the upstream wall and the downstream wall.

28. The air passage open/close device according to claim 7, wherein only the peripheral part of the board member is inserted between the upstream wall and the downstream wall.

* * * * *